(12) United States Patent
Engstrand

(10) Patent No.: US 7,388,188 B2
(45) Date of Patent: Jun. 17, 2008

(54) APPARATUS, SYSTEM AND METHOD FOR DETECTING A POSITION OF A MOVABLE ELEMENT IN A COMPARTMENT

(75) Inventor: Bradley Engstrand, Hartford, WI (US)

(73) Assignee: Motion Controls, LLC, Hartford, WI (US)

( * ) Notice: Subject to any disclaimer, the term of this patent is extended or adjusted under 35 U.S.C. 154(b) by 55 days.

(21) Appl. No.: 11/238,893

(22) Filed: Sep. 29, 2005

(65) Prior Publication Data

US 2007/0069163 A1    Mar. 29, 2007

(51) Int. Cl.
*H01J 40/14*    (2006.01)

(52) U.S. Cl. .................................. 250/221; 250/559.3

(58) Field of Classification Search ............. 250/208.1, 250/208.2, 222.1, 227.11, 221, 239, 559.29, 250/559.3, 548; 91/1, 361; 92/5 R; 71/1, 71/361; 123/193.1; 356/622
See application file for complete search history.

(56) References Cited

U.S. PATENT DOCUMENTS

| | | | |
|---|---|---|---|
| 3,368,751 A | 2/1968 | Merrill | |
| 3,885,872 A | 5/1975 | Howe, Jr. et al. | |
| 4,150,299 A | 4/1979 | Kasiewicz et al. | |
| 4,501,642 A | 2/1985 | Wells | |
| 4,661,695 A * | 4/1987 | Mori et al. ............. | 250/227.11 |
| 4,736,674 A | 4/1988 | Stoll | |
| 4,806,707 A | 2/1989 | Landmeier | |
| 4,902,903 A | 2/1990 | Segerson et al. | |
| 4,970,361 A | 11/1990 | Fuse | |
| 5,182,979 A | 2/1993 | Morgan | |
| 5,184,009 A * | 2/1993 | Wright et al. .......... | 250/227.11 |
| 5,231,959 A | 8/1993 | Smietana | |
| 5,271,505 A | 12/1993 | Low | |
| 5,705,742 A | 1/1998 | Fox et al. | |
| 5,744,705 A | 4/1998 | Derouen et al. | |
| 5,799,629 A | 9/1998 | Lowi, Jr. | |
| 5,977,778 A * | 11/1999 | Chan et al. ................. | 324/635 |
| 5,988,676 A | 11/1999 | Lotito et al. | |
| 6,058,776 A | 5/2000 | Algers et al. | |
| 6,170,573 B1 | 1/2001 | Brunet et al. | |
| 6,952,009 B1 | 10/2005 | Engstrand | |
| 2004/0089797 A1 | 5/2004 | Engstrand | |

OTHER PUBLICATIONS

U.S. Appl. No. 11/242,799, filed Oct. 3, 2005, Engstrand.

* cited by examiner

*Primary Examiner*—Que T Le
(74) *Attorney, Agent, or Firm*—Patents+TMS, P.C.

(57) ABSTRACT

The apparatus, the system and the method measure a distance and/or an intensity of emitted light. The apparatus and the system have a compartment, a movable element and/or a sensor array in an interior of the compartment. The sensor array emits light, detects light detects temperature of air and/or detects pressure of the air inside the interior of the compartment. The movable element and/or the interior surface of the compartment absorbs emitted light from the sensor array in the compartment. The sensor array determines and/or measures an intensity of the emitted light from the sensor array which is not absorbed by the movable element and/or an interior surface of the compartment. The intensity of emitted light is based on, corresponds to and/or is indicative of a position P of the movable element in the interior of the compartment. A microprocessor may detect, may measure and/or may calculate the position P of the movable element in the compartment based on the intensity of emitted light detected by the sensor array.

13 Claims, 5 Drawing Sheets

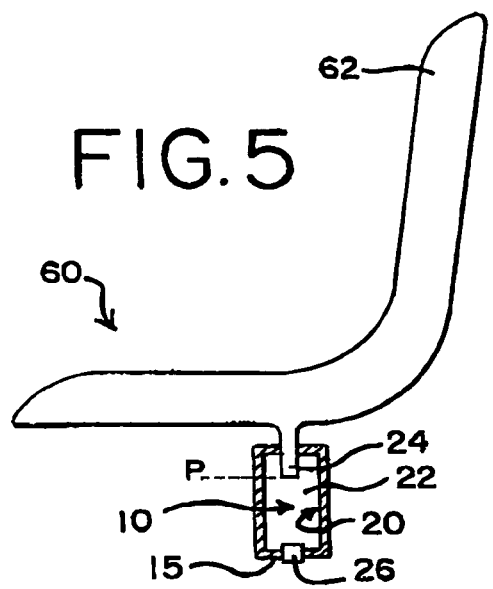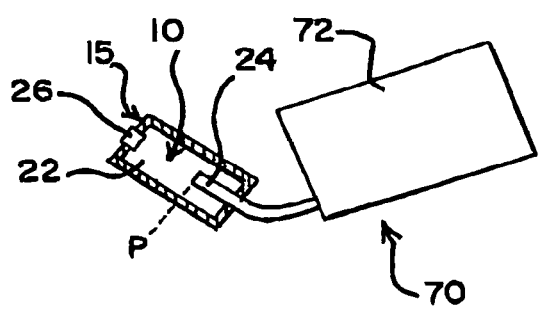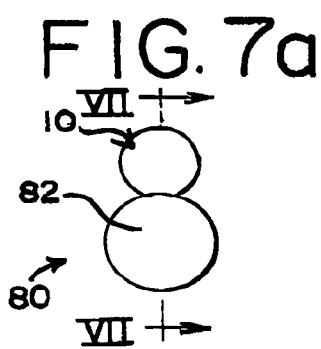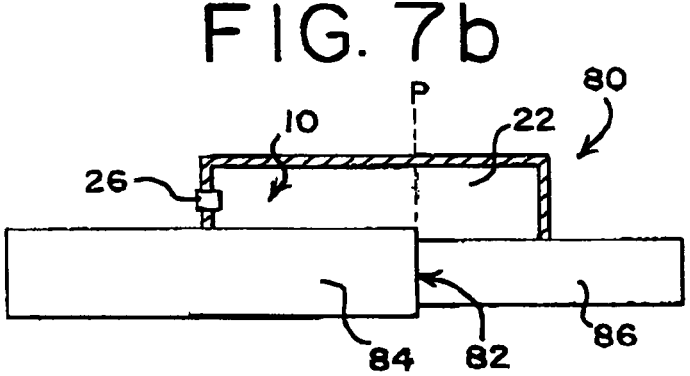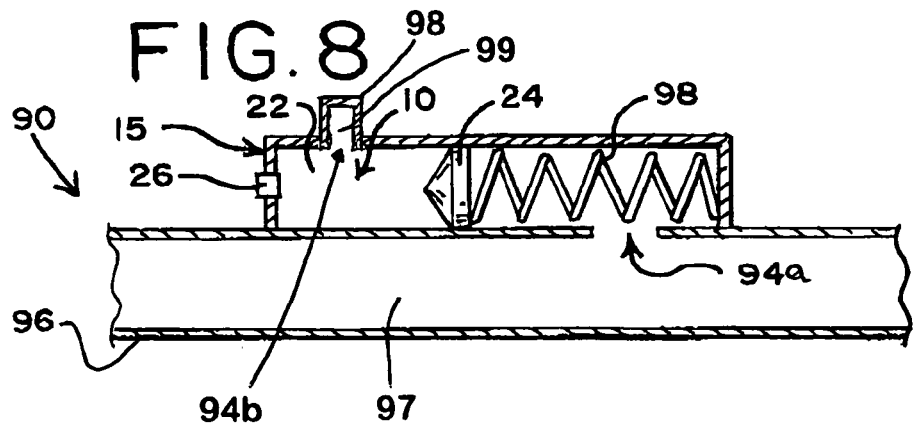

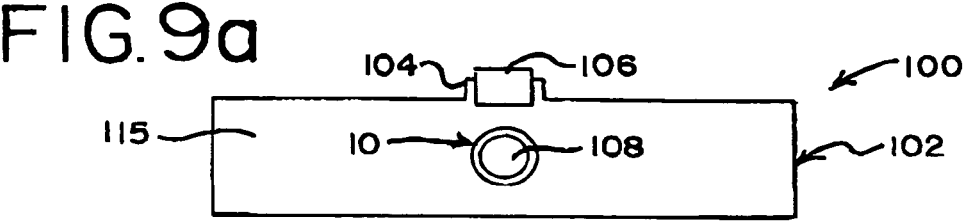
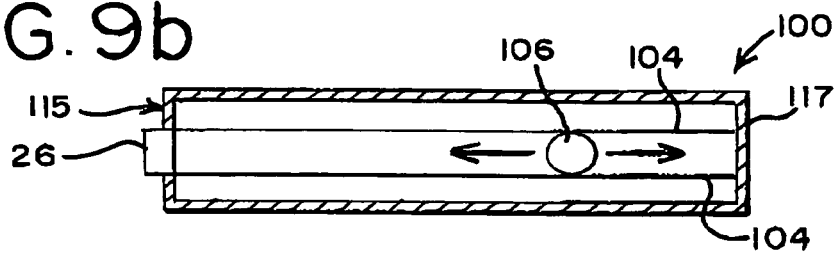
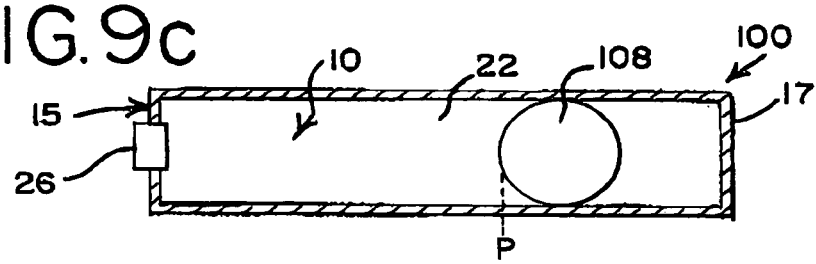
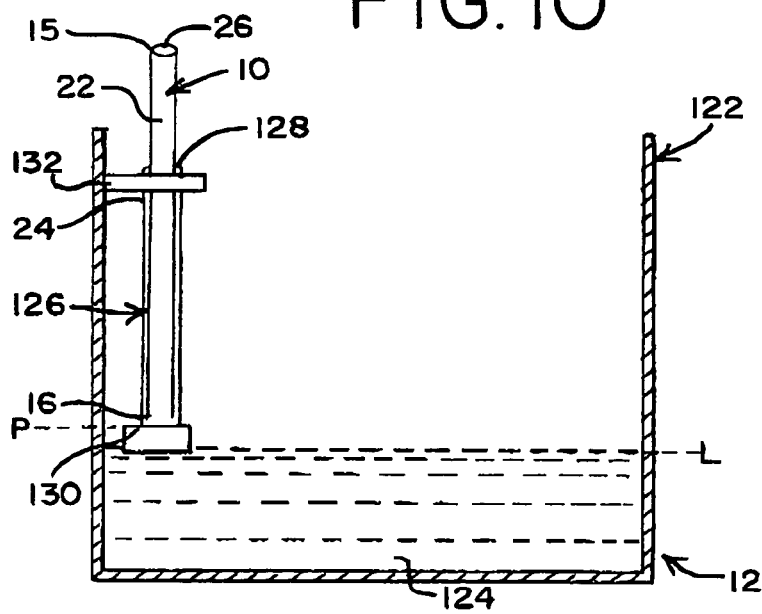
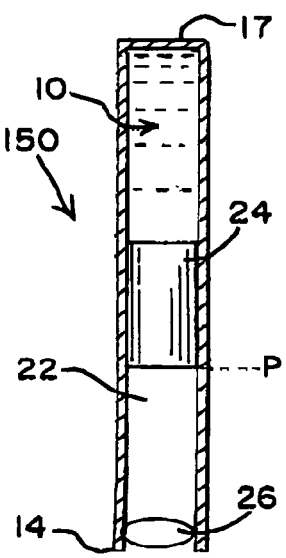

APPARATUS, SYSTEM AND METHOD FOR DETECTING A POSITION OF A MOVABLE ELEMENT IN A COMPARTMENT

BACKGROUND OF THE INVENTION

The present invention generally relates to an apparatus, a system and a method for detecting a position and/or an intensity of emitted light. More specifically, the present invention relates to an apparatus, a system and a method which has a sensor array in a compartment for detecting an intensity of emitted light from a light source in the compartment. The sensor array may emit a light, may detect a light, may detect a temperature of air and/or may detect a pressure of air in the compartment. The intensity of emitted light which may be detected by the sensor array may correspond to a position of a movable element within an interior of the compartment. A microprocessor may determine and/or may calculate the position of the movable element within the compartment based on the intensity of emitted light detected by the sensor array. The intensity of the emitted light may be based on an amount of the emitted light which may not be absorbed by an interior of the compartment and/or by the movable element. The microprocessor may monitor a strength of the emitted light from the sensor array for compensating or for correcting the sensor array based on the strength of the emitted light from the light source. An output device may be connected to the microprocessor and/or may display information based on the intensity of emitted light detected by the sensor array, a pressure of air in the compartment, a temperature of the air in the compartment, the position of the movable element and/or the strength of the emitted light from the light source.

It is, of course, generally known to measure and/or to detect a position of a movable element in a compartment. The position of the movable element in the compartment may correspond to a location of a machine element which may be connected to and/or may be attached to the movable element. The machine element may be, for example, a piston in a cylinder or a tab connected to a machine part. Monitoring of the position of the movable element in the compartment may lead to detection of irregularities within the machine element or machine part as well as an indication of the overall efficiency of the machine element or machine part. Typically, a first sensor in the compartment or adjacent to the movable element must contact the movable element to detect, to determine and/or to measure the position of the movable element with respect to the compartment. The position of the movable element in the compartment may correspond to a position of the machine element and/or the machine part with respect to the compartment. A second sensor may be required to be attached to, to be connected to and/or to contact the movable element, the machine element and/or the machine part to increase an accuracy of the first sensor for detecting and/or for measuring the position of the movable element.

However, contact between the movable element and the first sensor may cause the first sensor to inaccurately detect and/or to inaccurately measure the position of the movable element in the compartment. Further, contact between the movable element and the first sensor may damage and/or may destroy the movable element and/or the first sensor. As a result, the first sensor may be inoperable or may inaccurately detect and/or may inaccurately measure the position of the movable element in the compartment. Moreover, contact between the second sensor and the movable element, the machine element and/or the machine part may damage and/or may destroy the second sensor, the movable element, the machine element and/or the machine part. As a result, the second sensor may be inoperable or may be incapable of increasing the accuracy of the first sensor.

A need, therefore, exists for an apparatus, a system and a method for detecting a position and/or an intensity of emitted light. Additionally, a need exists for an apparatus, a system and a method for detecting a position and/or an intensity of emitted light which may have a sensor array in a compartment for detecting a position of a movable element in the compartment. Further, a need exists for an apparatus, a system and a method for detecting a position and/or an intensity of emitted light which may detect and/or may measure an intensity of emitted light unabsorbed by an interior surface of the compartment and/or by a movable element in the compartment. Still further, a need exists for an apparatus, a system and a method for detecting a position and/or an intensity of emitted light which may have a sensor array and/or a microprocessor to calculate and/or to determine a position of a movable element in a compartment based on an intensity of emitted light in the compartment. Moreover, a need exists for an apparatus, a system and a method for detecting a position and/or an intensity of emitted light which may not require contact between a sensor array and a movable element in a compartment to determine the position of the movable element in the compartment.

SUMMARY OF THE INVENTION

The present invention provides an apparatus, a system and a method for detecting a position and/or an intensity of emitted light. The apparatus, the system and the method may have a compartment with a movable element and/or a sensor array in an interior of the compartment. The sensor array may have a light source, a first light sensor, a second light sensor, a third light sensor, a temperature sensor and/or a pressure sensor. The movable element and/or an interior surface of the compartment may absorb emitted light from the sensor array in the compartment. The sensor array may determine and/or may measure a strength and/or an intensity of emitted light from the sensor array which may not be absorbed by the movable element and/or the interior surface of the compartment. The intensity of emitted light may be based on and/or may be indicative of an amount of emitted light absorbed by the movable element and/or the interior surface of the compartment. A microprocessor may detect, may measure and/or may calculate the position of the movable element in the compartment based on the intensity of emitted light in the compartment which may be detected by the sensor array.

To this end, in an embodiment of the present invention, an apparatus for measuring a position is provided. The apparatus has a compartment having a body defining an interior wherein the body has an interior surface, an exterior surface and a length defined between a first end and a second end. Further, the apparatus has a movable element within the interior of the compartment wherein the movable element is located at a position in the interior. Still further, the apparatus has a first wall at the first end wherein the first wall abuts the body of the compartment. Moreover, the apparatus has a first sensor array on the first wall wherein the first sensor array extends inward with respect to the interior of the compartment wherein the first sensor array emits a light into the interior wherein the first sensor array detects an intensity of emitted light within the interior and further wherein the first sensor array detects a strength of the light emitted into the interior wherein the intensity of emitted light corresponds to the position of the movable element within the interior of the compartment.

In an embodiment, the apparatus has a second wall attached to the second end of the compartment.

In an embodiment, the apparatus has a spring attached to the movable element.

In an embodiment, the apparatus has a magnet coupled to the movable element.

In an embodiment, the apparatus has a groove attached to the exterior surface of the compartment.

In an embodiment, the apparatus has a hole in the compartment extending from the interior surface to the exterior surface.

In an embodiment, the apparatus has a tab attached to the interior surface of the compartment.

In another embodiment of the present invention, system for measuring a position is provided. The system has a compartment having a body defining an interior wherein the body has an interior surface, an exterior surface and a length defined between a first end and a second end. Further, the system has a first wall at the first end wherein the first wall abuts the body of the compartment. Still further, the system has a movable element connected to the compartment wherein the movable element moves inward or outward with respect to the first wall wherein the movable element is located at a position with respect to the first wall. Moreover, the system has a first sensor array on the first wall wherein the first sensor array extends inward with respect to the interior of the compartment wherein the first sensor array emits a light into the interior wherein the first sensor array detects intensity of emitted light within the interior and further wherein the first sensor array detects a strength of the light emitted into the interior wherein the intensity of emitted light corresponds to the position of the movable element. Furthermore, the system has a microprocessor in communication with the first sensor array wherein the microprocessor determines the position of the movable element based on the intensity of emitted light detected by the first sensor array.

In an embodiment, the movable element is insertable into the interior of the compartment.

In an embodiment, the system has a second sensor array located within the interior of the compartment.

In an embodiment, the system has a magnet coupled to the movable element.

In an embodiment, the system has a spring attached to the movable element.

In an embodiment, the system has an output device connected to the microprocessor.

In another embodiment of the present invention, a method for determining a position is provided. The method has the step of providing a compartment having a body defining an interior wherein the body has an interior surface, an exterior surface and a length defined between a first end and a second end wherein the compartment has a first wall at the first end wherein the first wall abuts the body of the compartment. Further, the method has the step of connecting a movable element to the compartment wherein the movable element is located at a first position with respect to the first wall. Moreover, the method has the steps of emitting a light into the interior and detecting an intensity of emitted light within the interior and a strength of the light emitted into the interior.

In an embodiment, the method has the step of determining the first position of the movable element based on the intensity of emitted light within the interior.

In an embodiment, the method has the step of detecting a pressure of air within the interior of the compartment or a temperature of the air within the interior of the compartment.

In an embodiment, the method has the step of moving the movable element to a second position with respect to the first wall of the compartment.

In an embodiment, the method has the step of compensating the strength of light emitted into the interior of the compartment or the intensity of emitted light within the interior of the compartment.

In an embodiment, the method has the step of inserting the movable element into the interior of the compartment.

In an embodiment, the method has the step of displaying information based on the intensity of emitted light within the interior of the compartment.

It is, therefore, an advantage of the present invention to provide an apparatus, a system and a method for detecting a position and/or an intensity of emitted light which may have a compartment with an interior and/or a movable element and/or a sensor array in the interior of the compartment.

Another advantage of the present invention is to provide an apparatus, a system and a method for detecting a position and/or an intensity of emitted light which may have a sensor array in an interior of compartment for emitting light and/or for detecting and/or measuring an intensity of an emitted light in the compartment.

And, another advantage of the present invention is to provide an apparatus, a system and a method for detecting a position and/or an intensity of emitted light which may have an interior of a compartment and/or a movable element in the interior for absorbing light emitted from a sensor array in the interior of the compartment.

Yet another advantage of the present invention is to provide an apparatus, a system and a method for detecting a position and/or an intensity of emitted light which may have a sensor array for detecting and/or for measuring an intensity of emitted light in a compartment to determine the position of a movable element in the compartment.

A further advantage of the present invention is to provide an apparatus, a system and a method for detecting a position and/or an intensity of emitted light which may have a sensor array in an interior of a compartment to determine a strength of emitted light in the compartment.

Moreover, an advantage of the present invention is to provide an apparatus, a system and a method for detecting a position and/or an intensity of emitted light which may have a sensor array with a light source, a first light sensor, a second light sensor, a third light sensor, a temperature sensor and/or a pressure sensor to measure and/or to determine a position of a movable element in the compartment.

And, another advantage of the present invention is to provide an apparatus, a system and a method for detecting a position and/or an intensity of emitted light which may have a microprocessor and/or an output device to illustrate, to process, to calculate, to display and/or to communicate information based on an intensity of emitted light, a strength of emitted light from a sensor array and/or a position of a movable element in an interior of a compartment.

Yet another advantage of the present invention is to provide an apparatus, a system and a method for detecting a position and/or an intensity of emitted light which may provide a microprocessor to correct, to compensate and/or to adjust a sensor array in a compartment based on a strength of a light emitted in the compartment.

Another advantage of the present invention is to provide an apparatus, a system and a method for detecting a position and/or an intensity of emitted light which may have a microprocessor and/or an output device to display and/or to communicate information to a user based on an intensity of emitted light and/or a position of a movable element.

Yet another advantage of the present invention is to provide an apparatus, a system and a method for detecting a position and/or an intensity of emitted light which may determine and/or may measure a degree of angle of a compartment with respect to a body of mass.

A still further advantage of the present invention is to provide an apparatus, a system and a method for detecting a position and/or an intensity of emitted light which may determine and/or may measure a position of a machine element in an open ended compartment and/or an open ended proximity sensor.

Moreover, an advantage of the present invention is to provide an apparatus, a system and a method for detecting a position and/or an intensity of emitted light which may have a microprocessor in an interior of a compartment or in a location remote with respect to the compartment.

And, another advantage of the present invention is to provide an apparatus, a system and a method for detecting a position and/or an intensity of emitted light which may have a sensor array within a manufactured machine part for detecting an intensity of an emitted light to determine a position of movable element within the machine part.

Yet another advantage of the present invention is to provide an apparatus, a system and a method for detecting a position and/or an intensity of emitted light which may be molded and/or may be formed into a furnishing, such as, for example, a chair, a seat, a cushion to determine a weight of an occupant of the furnishing.

Moreover, an advantage of the present invention is to provide an apparatus, a system and a method for detecting a position and/or an intensity of emitted light which may determine and/or may measure an incline of the apparatus.

And, another advantage of the present invention is to provide an apparatus, a system and a method for detecting a position and/or an intensity of emitted light which may monitor a position of a louver in duct work of a heating, ventilation and air-conditioning (hereinafter "HVAC") system.

Yet another advantage of the present invention is to provide an apparatus, a system and a method for detecting a position and/or an intensity of emitted light which may be built in a duct work of an HVAC system, in a window frame, in a door frame, in an elevator opening and/or the like.

Another advantage of the present invention is to provide an apparatus, a system and a method for detecting a position and/or an intensity of emitted light which may be in a shock absorber to determine weight information or in a spring loaded device to determine a vacuum of an attached cylinder.

Yet another advantage of the present invention is to provide an apparatus, a system and a method for detecting a position and/or an intensity of emitted light which may determine barometric pressure information and/or ambient air pressure information based on a position of a movable element in a compartment.

A still further advantage of the present invention is to provide an apparatus, a system and a method for detecting a position and/or an intensity of emitted light which may intake an amount of air to determine and/or to measure a barometric pressure.

Moreover, an advantage of the present invention is to provide an apparatus, a system and a method for detecting a position and/or an intensity of emitted light which may have a sensor array to determine and/or to measure an air pressure in and/or air temperature in a compartment for measuring a position of a movable element in the compartment.

And, another advantage of the present invention is to provide an apparatus, a system and a method for detecting a position and/or an intensity of emitted light which may have a closed hollow tube, a compartment and/or a sensor array in an interior of the compartment to determine and/or to measure a fluid level in a fluid container.

Yet another advantage of the present invention is to provide an apparatus, a system and a method for detecting a position and/or an intensity of emitted light which may have a sensor array to detect and/or to measure a position of a first magnet in a track coupled to a second magnet in an interior of a compartment.

Moreover, an advantage of the present invention is to provide an apparatus, a system and a method for detecting a position and/or an intensity of emitted light which may detect and/or may measure a position of linear bearings in an industrial erector set.

And, another advantage of the present invention is to provide an apparatus, a system and a method for detecting a position and/or an intensity of emitted light which utilize a vacuum and/or an amount of a fluid in a compartment to determine barometric pressure information.

Additional features and advantages of the present invention are described in, and will be apparent from, the detailed description of the presently preferred embodiments and from the drawings.

BRIEF DESCRIPTION OF THE DRAWINGS

FIG. 5 illustrates a cross-sectional view of a compartment connectable to a seat with a sensor array and a movable element in another embodiment of the present invention.

FIG. 6 illustrates a cross-sectional view of a compartment connectable to a louver with a sensor array and a movable element in another embodiment of the present invention.

FIG. 7a illustrates a top view of a compartment attachable to a body in another embodiment of the present invention.

FIG. 7b illustrates a cross-sectional view of the compartment the body in FIG. 7a with the sensor array as taken along line VII-VII in an embodiment of the present invention.

FIG. 8 illustrates a cross-sectional view of a spring-loaded compartment attachable to a body with a sensor array in another embodiment of the present invention.

FIG. 9a illustrates a front plan view of, a compartment with a first magnet a second magnet in another embodiment of the present invention.

FIG. 9b illustrates a top plan view of the compartment of FIG. 9a with the first magnet in an embodiment of the present invention.

FIG. 9c illustrates a cross-sectional view of the compartment of FIG. 9a with a sensor array and the second magnet in an interior of the compartment as taken along line IX-IX in an embodiment of the present invention.

FIG. 10 illustrates a cross-sectional view of a compartment and a tube in a container showing a sensor array in another embodiment of the present invention.

FIG. 11 illustrates a cross-sectional view of a barometric tube with a movable element and a sensor array in another embodiment of the present invention.

DETAILED DESCRIPTION OF THE PRESENTLY PREFERRED EMBODIMENTS

The present invention generally relates to an apparatus, a system and a method for detecting a position and/or an intensity of emitted light. The apparatus, the system and the method may have a compartment with an interior, an exterior and/or an interior surface. The apparatus, the system and the method may have a sensor array and/or a movable element in the interior of the compartment. The sensor array may detect an intensity of an emitted light in the interior of the compartment. The intensity of the emitted light detected by the sensor array may correspond to a position of the movable element in the compartment. The sensor array may detect, may calculate and/or may determine the position of the movable element based on the intensity of the emitted light from the sensor array in the compartment.

Figure 1:
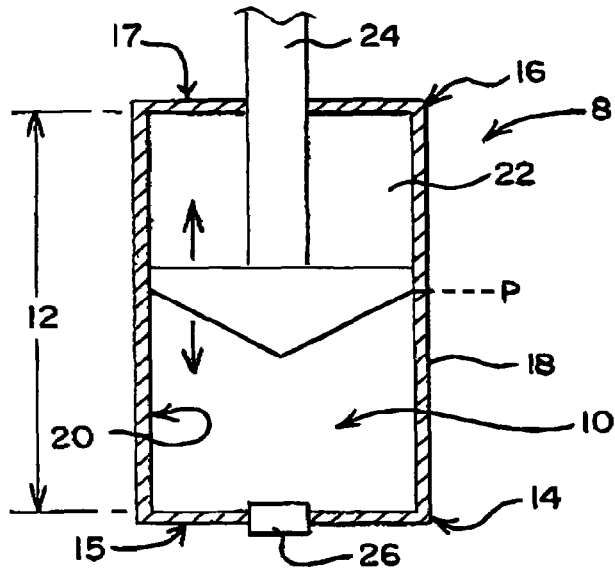
FIG. 1 illustrates a cross-sectional view of a compartment with a movable element and a sensor array in an embodiment of the present invention.

Referring now to the drawings wherein like numerals refer to like parts, FIG. 1 illustrates an apparatus 8 having a compartment 10 which may have a length 12 defined between a first end 14 and a second end 16. The second end 16 is opposite to the first end 14. The first end 14 and/or the second end 16 may have a first wall 15 and/or a second wall 17, respectively. The compartment 10 may have an exterior surface 18 and/or an interior surface 20 which may define an interior 22. The first wall 15 and/or the second wall 17 may be perpendicular to the interior surface 20 and/or may substantially enclose the compartment 10. The compartment 10 may be a type of cylinder, such as, for example, a hydraulic cylinder, a pneumatic cylinder and/or the like. The compartment 10 may be, for example, a hollow tube and/or the like. The present invention should not be deemed as limited to a specific embodiment of the type of the cylinder of the compartment 10.

The system 8 may have a movable element 24 which may be positioned and/or may be located in the interior 22 of the compartment 10. The movable element 24 may move in the interior 22 of the compartment 10 between the first end 14 and the second end 16. The movable element 24 may move to, may be positioned at and/or may be located at a position P in the interior 22 of the compartment 10 between the first end 14 and the second end 16. The movable element 24 may be, for example, a piston, a sphere, a machine element, a tab, a flange, a spring, a magnet, a closed tube and/or the like. The present invention should not be deemed as limited to a specific embodiment of the movable element 24. It should be understood that the movable element 24 may be any movable element known to one of ordinary skill in the art.

Figure 12:
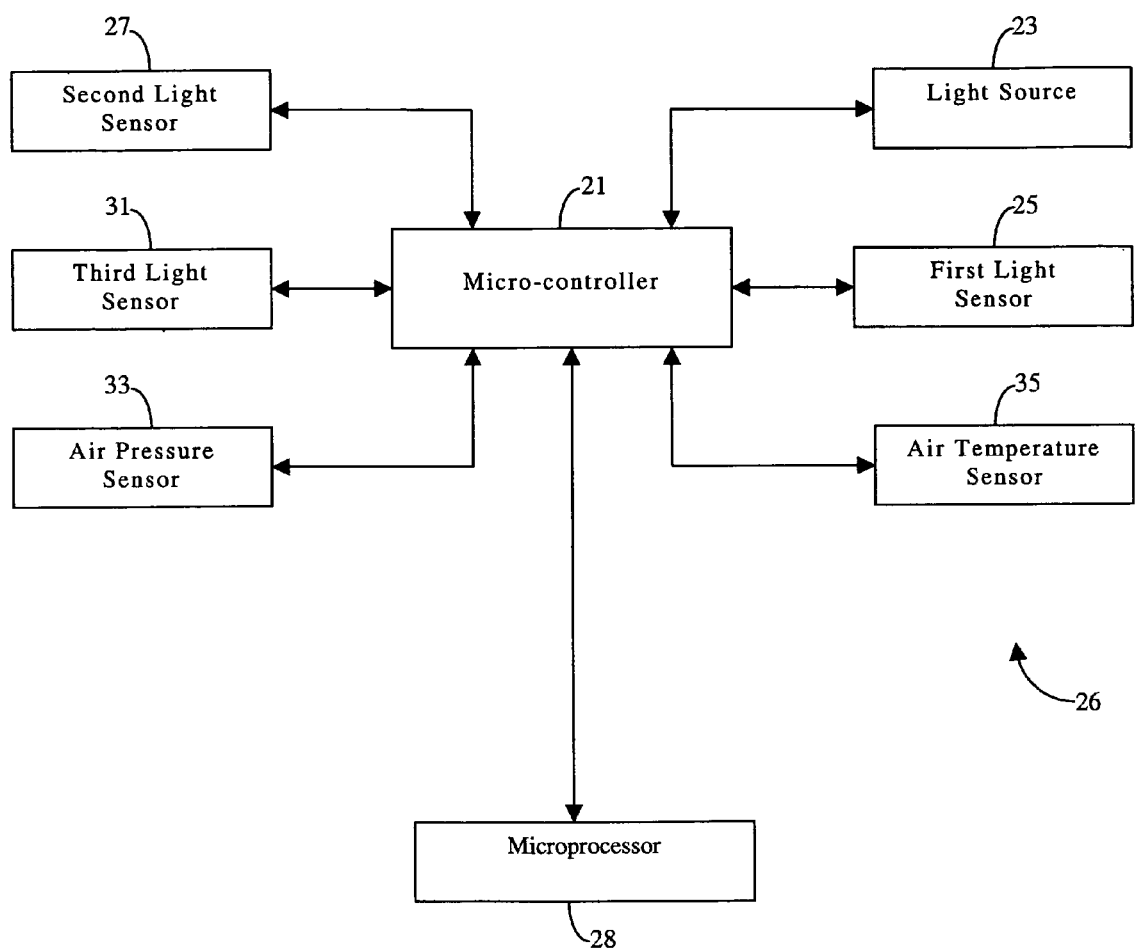
FIG. 12 illustrates a black box diagram of a sensor array in another embodiment of the present invention.

The interior 22 of the compartment 10 may have a sensor array 26 as shown in FIG. 1. The sensor array 26 may have a micro-controller 21, a light source 23, a first light sensor 25 and/or a second light sensor 27 as illustrated in FIG. 12. Further, the sensor array 26 may have a third light sensor 31, an air pressure sensor 33 and/or an air temperature sensor 35. The micro-controller 21 may be connected to and/or may be in communication with the light source 23, the first light sensor 25, the second light sensor 27, the third light sensor 31, the air pressure sensor 33 the air temperature sensor 35 and/or a microprocessor 28.

The micro-controller 21 may be programmed to receive and/or to transmit an electrical signal and/or data from and/or to, respectively, the light source 23, the light sensors 25, 27, 31, the air pressure sensor 33 and/or the air temperature sensor 35. The microprocessor 28 may be programmed to receive and/or to transmit an electrical signal and/or data from and/or to, respectively, the light source 23, the light sensors 25, 27, 31, the air pressure sensor 33, and/or the air temperature sensor 35 via the micro-controller 21.

The sensor array 26 may be positioned on the interior surface 20 and/or on the first end 15 of the compartment 10. The light source 23 of the sensor array 26 may be directed inward with respect to the interior 22 of the compartment 10. The sensor array 26 may project and/or may emit light into the interior 22 of the compartment 10. The light source 23 of the sensor array 26 may be, for example, a light emitting diode (hereinafter "LED"), a halogen light, a flourescent light, an incandescent light, a neon light and/or the like. The present invention may not be deemed as limited to a specific embodiment of the sensor array 26. It should be understood that the sensor array 26 may have any light source capable of projecting and/or of emitting light as known to one of ordinary skill in the art.

The first light sensor 25, the second light sensor 27, the third light sensor 31, the air pressure sensor 33 and/or the air temperature sensor 35 of the sensor array 26 may be directed inward with respect to the interior 22 of the compartment 10. The sensor array 26 may detect, may determine and/or may measure an intensity of the emitted light into the interior 22 of the compartment 10. Further, the sensor array 26 may detect, may determine and/or may measure a strength of the light emitted into the interior 22 of the compartment 10. It should be understood that the sensor array may be any sensor array 26 capable of detecting, of determining and/or of measuring the intensity of the light in and/or the strength of the light emitted into the interior 22 of the compartment 10 known to one of ordinary skill in the art.

The compartment 10, the interior surface 20 of the compartment 10 and/or the movable element 24 may absorb an amount of the light emitted from the sensor array 26. Further, the compartment 10, the interior 20 of the compartment 10 and/or the movable element 24 may have light absorbing properties. As the movable element 24 may transpose and/or may move through the cylinder 10, a portion of the light emitted from the sensor array 26 may be absorbed by the movable element 24 and/or the interior surface 20 of the compartment 10 between the movable element 24 and the first end 15 of the compartment. The portion of the light which may be absorbed by the interior surface 20 and/or the movable element 26 may be based on the light absorbing properties of the material of the compartment 10 and/or the movable element 24. The sensor array 26 may detect, may determine and/or may measure an intensity of emitted light within the interior 22 of the compartment 10. The intensity of emitted light may be based on the portion of light not absorbed by the movable element 24 and/or the interior surface 20 between the movable element 24 and the first end 15. The intensity of light in the interior 22 of the compartment 10 may not have the portion of light which may be absorbed by the movable element 24 and/or the interior surface 22 between the movable element 24 and the first end 15 of the compartment.

Figure 2:
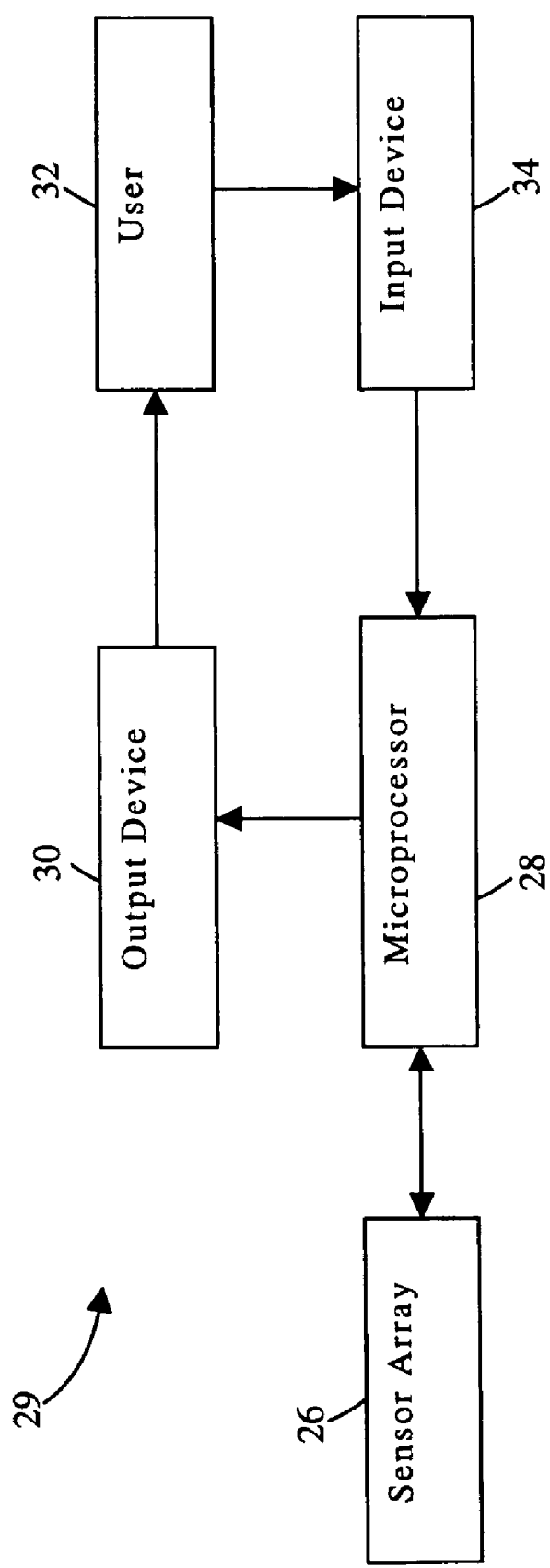
FIG. 2 illustrates a black box diagram of a system in another embodiment of the present invention.

FIG. 2 illustrates, in a black box diagram, an embodiment of a system 29 of the present invention. The sensor array 26 may be connected to and/or may be in communication with the microprocessor 28. The microprocessor 28 may be local with respect to the sensor array 26 and/or may be remote from the sensor array 26. The sensor array 26 may detect, may measure and/or may determine the intensity of light emitted within the interior 22 of the compartment 10 which may not be absorbed by the movable element 24 and/or the interior surface 22 between the movable element 24 and the first end 15 of the compartment 10. The position P of the movable element 24 in the interior 22 of the compartment 10 may correspond to, may relate to and/or may be indicative of the intensity of the emitted light detected by the sensor array 26 within the interior 22. The sensor array 26 may detect, may measure and/or may determine the intensity of the emitted light within the interior 22.

The sensor array 26 may transmit, may send and/or may communicate position information to the microprocessor 28. The position information may relate to, may be based on, may correspond to and/or may be indicative of the intensity of the emitted light detected by the sensor array 26. The microprocessor 28 may be programmed to process the position information received from the sensor array 26. The microprocessor 28 may be programmed to measure, to determine and/or to identify the position P of the movable element 24 in the interior 22 of the compartment 10 based on the position information received from the sensor array 26.

The sensor array 26 may detect, may determine and/or may measure a strength of the light emitted into the interior 22 of the compartment 10 by the sensor array 26. The strength of the light may decrease over a period of time based on a deterioration of and/or damage to the light emitting portion of the sensor array 26. The intensity of the emitted light may be based on, may be effected by and/or may be decreased by the deterioration of and/or damage to the light emitting portion of the sensor array 26. The intensity of the emitted light detected by the sensor array 26 may be based on, may correspond to and/or may be indicative of the strength of the light emitted into the interior 22 of the compartment 10. The microprocessor 28 may be programmed to correct and/or to compensate the sensor 26 based on the strength of the light emitted into the interior 22 of the compartment 10 by the sensor array 26.

The sensor array 26 may detect, may determine and/or may measure a pressure of air within and/or a temperature of the air within the interior 22 of the compartment 10. The intensity of the emitted light may be based on, may be effected by, may be increased and/or may be decreased by the pressure of the air within and/or the temperature of the air within the interior 22 of the compartment 10. The intensity of the emitted light detected by the sensor array 26 may be based on, may correspond to and/or may be indicative of the pressure of the air within and/or the temperature of the air within the interior 22 of the compartment 10. The microprocessor 28 may be programmed to correct and/or to compensate the sensor array 26 based on the pressure of the air within and/or the temperature of the air within the interior 22 of the compartment 10.

The sensor array 26 may detect, may determine and/or may measure the strength of the light emitted into, the pressure of the air within and/or the temperature of the air within the interior 22 of the compartment 10. The sensor array 26 may transmit, may send and/or may communicate strength information, pressure information and/or temperature information to the microprocessor 28. The strength information, the pressure information and/or the temperature information may correspond to, may be based on and/or may be indicative of the strength of the light emitted into, the pressure of the air within and/or the temperature of the air within, respectively, the interior 22 of the compartment 10.

The microprocessor 28 may process the strength information, the pressure information and/or the temperature information received from the sensor array 26. The microprocessor 28 may be programmed to determine and/or to measure an affect on the intensity of emitted light from the strength information, from the pressure information and/or from the temperature information. The microprocessor 28 may be programmed to correct and/or to compensate the position information and/or the sensor array 26 based on the affect on the intensity of emitted light from the strength information, the pressure information and/or the temperature information.

The intensity of the emitted light detected by the sensor array 26 may be affected by the effect from the strength of the light emitted into, from the pressure of the air within and/or from the temperature of the air within the interior 22 of the compartment 10. As a result, the sensor array 26 may accurately determine the position P of the movable element 24 in the interior 22 of the compartment 10. The microprocessor 28 may be programmed to compensate and/or to correct the position information based on the length 12 of the compartment 10 and/or a shape of the interior 22 of the compartment 10.

The microprocessor 28 may be connected to and/or may be in communication with an output device 30. The output device 30 may be local with respect to the microprocessor 28 and/or the sensor array 26 and/or may be remote from the microprocessor 28 and/or the sensor array 26. The output device 30 may be a printer, a monitor, a handheld device, a speaker and/or the like. The output device 30 may display, may indicate and/or may communicate display information to a user 32. The display information may relate to, may correspond to and/or may be based on the position information, the strength information, the pressure information, the temperature information and/or the position P of the movable element 24. The output device 30 may print a hard copy that may illustrate the display information for the user 32. It should be understood that the output device 30 may be any output device capable of communicating the display information to the user 32 known to one of ordinary skill in the art.

The display information may be, for example, logarithmic, linear and/or the like. Further, the display information may be in one or more formats, such as, for example, voltages, currents, pulses, numbers and/or the like. The microprocessor 28 may be programmed to convert, to format and/or to transform the display information between the one or more formats. The present invention should not be deemed as limited to a specific embodiment of the one or more formats of the display information. It should be understood that the format of the display information may be any format known to one of ordinary skill in the art.

An input device 34 may be connected to and/or in communication with the microprocessor 28. The input device 34 may be utilized by the user 32 to operate, to control and/or to instruct the microprocessor 28. The input device 34 may be a keyboard, a handheld device, a wireless portable device, a dial, a switch and/or the like. The input device 34 may be remote with respect to the microprocessor 28 and/or the output device 30. The microprocessor 28 may be programmed to receive instructions from the user 32 via the input device 34. The user 34 may select and/or may control the output device 30, the display information and/or the one or more formats of the display information via the input device 34. The present invention should not be deemed as limited to a specific embodiment of the input device 34. It should be understood that the input device 34 may be any input device capable of communicating instructions to the microprocessor 28.

Figure 3:
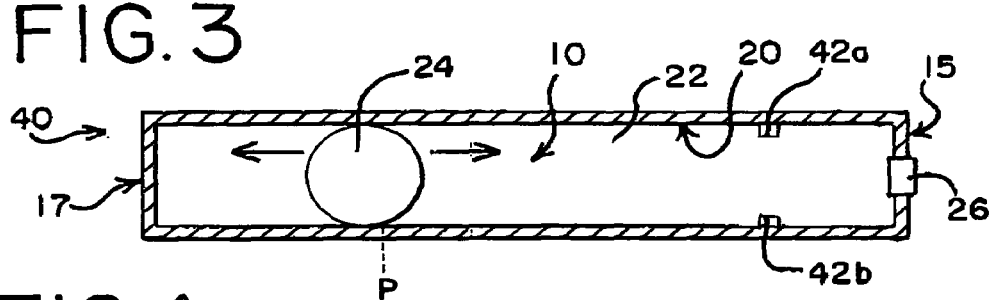
FIG. 3 illustrates a cross-sectional view of a compartment with a movable element and a sensor array in another embodiment of the present invention.

FIG. 3 illustrates a system 40 in an embodiment of the present invention. The system 40 may have the compartment 10, the first wall 15 with the sensor array 26 and/or the second wall 17. The movable element 24 may be within the interior 22 of the compartment 10 and/or may be movable between the first wall 15 and the second wall 17. The movable element 24 may be, for example, a ball and/or the like. The interior 22 may have tabs 42a, 42b which may extend outward with respect to the interior surface 20 of the compartment 10. The tabs 42a, 42b may prevent the movable element 24 from abutting and/or from contacting the sensor array 26. The movable element 24 may move within the interior 22 between the second wall 17 and the tabs 42a, 42b.

The system 40 may be, for example, an inclinometer which may determine an angle of the compartment 10 with respect to a body of mass, such as, for example, the earth. The system 40 may determine an angle of incline of the compartment 10 between the first end 14 and the second end 16 with respect to the body of mass. The position P of the movable element 24 in the interior 22 may correspond to the angle of incline of the compartment 10. The sensor array 26 may detect and/or may measure the intensity of emitted light in the interior 22 which may not be absorbed by the movable element 24 and the interior surface 20 between the movable element 24 and the first wall 15. The microprocessor 28 may receive the position information from the sensor array 26 based on the intensity of emitted light detected by the sensor array 26. The microprocessor 28 may be programmed to calculate, to measure and/or to determine the angle of incline of the compartment based on the intensity of emitted light detected by the sensor array 26. The output device 30 may display, may indicate and/or may communicate the angle of incline and/or the display information of the system 40 to the user 32.

Figure 4A:
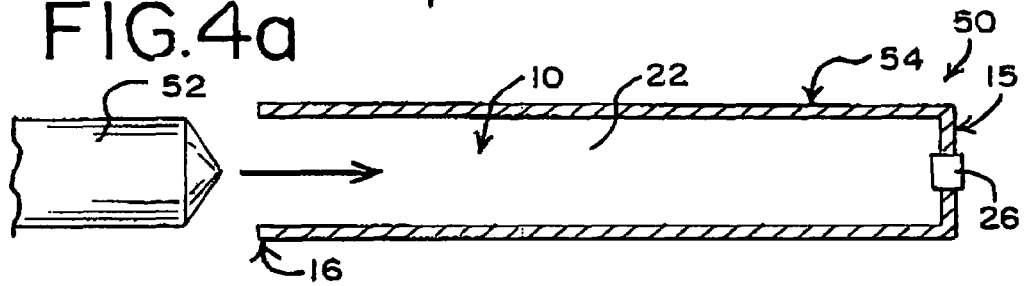
FIG. 4a illustrates a cross-sectional view of an open ended cylinder with a sensor array and a movable element outside of the open ended cylinder in another embodiment of the present invention.
Figure 4B:
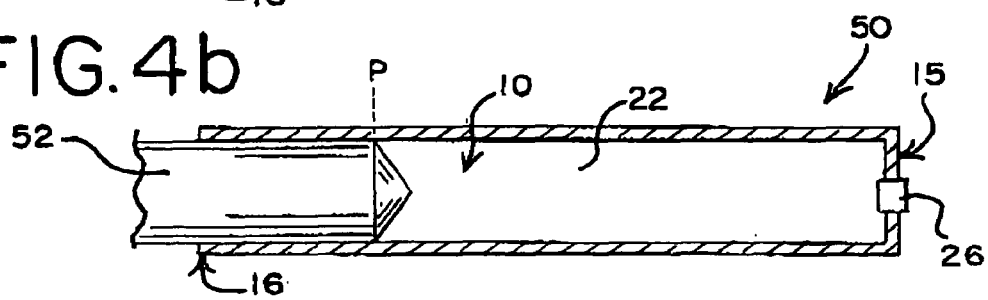
FIG. 4b illustrates a cross-sectional view of the open ended cylinder in FIG. 4b with the sensor array and the movable element inserted in the open ended cylinder in an embodiment of the present invention.

FIGS. 4a and 4b may illustrate a system 50 in an embodiment of the present invention. The system 50 may have the compartment 10 and the first wall 15 with the sensor array 26. The second end 16 of the compartment may be open ended. A machine element 52 of a machine (not shown in the figures) may be outside of the interior 22 of the compartment 10 and/or may be moving inward with respect to the interior 22 as illustrated in FIG. 4a. The machine element 52 may be inserted and/or may be moved to the position P in the interior 22 of the compartment 10 as illustrated in FIG. 4b.

The system 50 may, for example, determine a distance between the sensor array 26 and the machine element 52. The compartment 10 may be molded into, for example, a component (not shown in the figures) of a machine 54. The sensor array 26 may detect, may determine and/or may measure the intensity of emitted light in the interior 22 of the compartment which may not be absorbed by the machine element 52 and/or the interior surface 20 between the machine element 52 and the first wall 15. The microprocessor 28 may be programmed to calculate, to determine and/or to measure the position P of the machine element 52 based on the intensity of emitted light detected by the sensor array 26. The position P of the element 52 may correspond to and/or may be indicative of the distance between the machine element 54 and the sensor array 26. The output device 30 may display, may indicate and/or may communicate the distance and/or the display information of the system 50 to the user 32.

FIG. 5 illustrates a system 60 in an embodiment of the present invention. The system 60 may have the compartment 10, the first-wall 15 with the sensor array 26 and/or the second wall 17. The movable element 24 may be within the interior 22 of the compartment 10 and/or may be movable between the first wall 15 and the second wall 17. The movable element 24 may be attached to and/or may be integrally formed in a furnishing 62, such as, for example, a chair, a seat and/or platform. The furnishing 62 may be in, for example, a vehicle (not shown in the drawings), such as, for example, a boat, an automobile, an aircraft, a transport vehicle and/or the like. The present invention should not be deemed as limited by a specific embodiment of the furnishing 62 and/or the vehicle.

An occupant (not shown in the figures) may sit on, may occupy and/or may utilize the furnishing 62. The movable element 24 in the interior 22 may move inward with respect to the sensor array 26 based on a weight of the occupant. The movable element 24 may be inserted and/or may move inward with respect to the interior 22 to the position P based on the weight of the occupant. The sensor array 26 may detect, may measure, and/or may determine the intensity of the emitted light which may not be absorbed by the movable element 24 and/or the interior surface 20 of the compartment 10. The position P of the movable element 24 may correspond to and/or may be indicative of the weight of the occupant. The microprocessor 28 may be programmed to determine and/or to calculate the weight of the occupant based on the position P of the movable element and/or the intensity of emitted light detected by the sensor array 26. The output device 30 may display, may indicate and/or may communicate the weight of the occupant and/or the display information of the system 60 to the user 32.

FIG. 6 illustrates a system 70 in an embodiment of the present invention. The system 70 may have the compartment 10, the first end 15 with the sensor array 26 and/or the second wall 17. The movable element 24 may be within the interior 22 of the compartment 10 and/or may be movable between the first wall 15 and the second wall 17. The movable element 24 may be attached to and/or may be integrally formed in a louver 72. The louver 72 may be attached to and/or may be connected to a heating, ventilation and air conditioning (hereinafter "HVAC") system. The system 70 may be built into and/or may be integrally formed in a component of the HVAC system, such as, for example, duct work, a window frame, a door frame, an elevator opening and/or the like. The louver 72 may be, for example, an acoustic louver, a thin line louver and/or a sight-proof louver. The present invention should not be deemed as limited to a specific embodiment of the louver 72 and/or the component of the HVAC system An opening or a closing of the louver 72 within the duct work of the HVAC system may move the movable element 24 inward and/or outward with respect to the sensor array 26. The movable element 24 may be inserted and/or may be moved within the interior 22 to the position P based on the HVAC system. The sensor array 26 may detect, may measure and/or may determine the intensity of emitted light in the interior 22 which may not be absorbed by the movable element 24 and/or the interior surface 20.

The microprocessor 28 may be programmed to determine, to measure and/or to detect the position P of the movable element 24 in the interior 22 based on the intensity of emitted light detected by the sensor array 26. The position P may correspond to a position, such as, for example, an open position, a partially open position or a closed position of the louver 72. The microprocessor may be programmed to determine the position of the louver 72 based on the position P of the movable element 24. The output device 30 may display, may indicate and/or may communicate the position of the louver 72 and/or the display information of the system 70 to the user 32.

FIGS. 7a and 7b illustrate a system 80 in an embodiment of the present invention. The system 80 may have the compartment 10 with the first wall 15 and/or the second wall 17. The first wall 15 and/or the second wall 17 may have the sensor arrays 26a, 26b. The movable element 24 may be within the interior 22 of the compartment 10 and/or may be movable between the first wall 15 and the second wall 17.

The compartment 10 may be attached to and/or may be connected to a shock absorber 82. The shock absorber 82 may have a first element 84 and a second element 86. The compartment 10 and/or the shock absorber 82 may be configured to allow the first element 84 to move inward or outward with respect to the second element 86. The movement of the first element 84 may be based on, may correspond to and/or may be indicative of a suspension system (not shown in the figures) of a vehicle (not shown in the figures). The first element 84 may move to the position P in the interior 22 of the compartment 10.

The sensor array 26 may detect, may measure and/or may determine the intensity of emitted light from the sensor arrays 26a, 26b in the interior 22. The intensity of emitted light may be based on an amount of light not absorbed by the shock absorber 82 and/or the interior surface 20 of the compartment 10. The microprocessor 28 may be programmed to determine, to calculate and/or to detect the position P of the first element 84 based on the intensity of emitted light detected by the sensor arrays 26a, 26b. The position P of the first element 84 may correspond to an amount of weight applied to the shock absorber 82. The microprocessor 28 may be programmed to determine, to calculate and/or to detect the amount of weight applied to the shock absorber 82 based on the position P of the first element 84. The output device 30 may display, may indicate and/or may communicate the amount of weight applied to the shock absorber 82 and/or the display information of the system 80 to the user 32.

FIG. 8 illustrates a system 90 in an embodiment of the present invention. The system 90 may have the compartment 10, the first wall 15 with the sensor array 26 and/or the second wall 17. The movable element 24 may be located within the interior 22 of the compartment 22 and/or may be movable between the first end 15 and the second end 17. A spring 90 may be attached to the second wall 17 and/or the movable element 24. As a result, the movable element 24 may be connected to the second wall 17. The spring 92 may prevent the movable element 24 from abutting and/or from contacting the sensor array 26. The compartment 10 may have openings 94a, 94b along the length 12. The openings 94a, 94b may extend from the interior surface 20 to the exterior surface 18. The compartment 10 may be attached to and/or may be connected to a first tube 96 and/or a second tube 98. The first tube 96 and/or the second tub 98 may have an interior 97 and/or an interior 99, respectively. The interior 97 and/or the interior 99 may be connected to the interior 22 via the openings 94a, 94b, respectively. The first tube 96 and/or the second tube 98 may be, for example, an exhaust tube, an injector tube, a hose and/or pipe within the vehicle. The present invention should not be deemed as limited by a specific embodiment of the tube 96.

The interior 22 of the compartment 10 may be accessed by and/or may be effected by the first tube 96 and/or the second tube 98 via the openings 94a, 94b, respectively. Alternatively, the compartment 10 may be integrally formed with the first tube 96 and/or the second tube 98. Air or a fluid may pass through the first tube 96 and/or the second tube 98 at a flow rate of speed. The flow rate of speed of the air or the fluid through the first tube 96 and/or the second tube 98 may create and/or may cause an amount of vacuum in the first tube 96, the second tube 98 and/or the interior 22 of the compartment. The amount of vacuum may move and/or force the movable element 22 to the position P in the interior 22 between the first end 15 and the second end 17. The spring 92 may prevent the movable element 24 from detaching from the second end 17. The position P of the movable element 24 may correspond to the amount of vacuum in the first tube 96 and/or the second tube 98, an air pressure in the first tube 96 and/or the second tube 98 and/or a difference between the air pressure of the first tube 96 and the second tube 98.

The sensor array 26 may detect, may measure and/or may determine the intensity of emitted light in the interior 22 which may not be absorbed by the movable element 24 and/or the interior surface 20 between the movable element 24 and the first end 15. The microprocessor 28 may be programmed to measure, to calculate and/or to determine the position P of the movable element 24 based on the intensity of the emitted light. The microprocessor may be programmed to measure, to calculate and/or to determine the amount of vacuum in the first tube 96 and/or the second tube 98, the air pressure in the first tube 96 and/or the second tube 98 and/or the difference between the air pressure of the first tube 96 and the second tube 98 based on the position P of the movable element 22. The output device may display, may indicate and/or may communicate the amount of vacuum, the air pressure, the difference between the air pressure and/or the display information of the system 90 to the user 32.

FIGS. 9a-9c illustrate a system 100 in an embodiment of the present invention. The system 100 may have a housing 102, a groove 104 on a top surface of the housing 102 and/or the compartment 10 as shown in FIGS. 9a and 9b. The housing may have a first end 115 and a second end 117. The first end 115 is opposite to the second end 117. The first end 115 of the housing 102 may correspond to the first end 15 of the compartment 10. The second end 117 of the housing 102 may correspond to the second end 17 of the compartment 10. The compartment 10 may extend internally within the housing 102 from the first end 115 to the second end 117 of the housing 102. A first magnet 106 may be inside the groove 104 of the housing 102. The first magnet 106 may move in the groove 104 between the first end 15 and the second end 17. A second magnet 108 may be coupled to, may be connected to and/or may attached to the first magnet 106 as illustrated in FIG. 9b. The second magnet 108 may be within the interior 22 of the compartment 10 as illustrated in FIG. 9c. As shown in FIGS. 9b and 9c, movement of the first magnet 106 between the first end 15 and the second end 17 may move the second magnet 108 to a position P in the interior 22 of the compartment 10.

The sensor array 26 at the first end 15 of the compartment 10 may detect, may determine and/or may measure the intensity of emitted light in the interior 22 which may not be absorbed by the second magnet 108 and/or the interior surface 20 between the second magnet 108 and the first end 15. The microprocessor 28 may be programmed to measure, to calculate and/or to determine the position P of the first magnet 106 and/or the second magnet 108 based on the intensity of emitted light. The position P of the first magnet 106 may correspond to and/or may be indicative of a distance between the first magnet 106 and the first end 15 of the compartment 10. The output device 30 may display, may indicate and/or may communicate the distance and/or the display information of the system 100 to the user 32.

FIG. 10 illustrates a system 120 in an embodiment of the present invention. The system 120 may have a container 122 which may contain, may hold and/or may store a fluid 124. The container 122 may be, for example, a barrel, a vat, a tank and/or the like. The fluid 124 may fill the container 122 to a level L. The system 120 may have a tube 126 which may have a first end 128 and/or a float 130. The float 130 may be opposite to the first end 128. The tube 126 may be buoyant and/or may float on the fluid 124 at the level L. The first end 128 of the tube 126 may extend outward with respect to the fluid 124, may be open ended and/or may be in an upright position with respect to the fluid 124. The present invention should not be deemed as limited to a specific embodiment of the container 122.

The system 120 may be, for example, a fluid depth sensor. The compartment 10 may be inserted into the first end 128 of the tube 126. The compartment 10 may have the first end 15 with the sensor array 26. The compartment 10 may be attached to, may be secured to and/or affixed to the container 122 via an attaching device 132. As a result, the compartment 10 may be stationary with respect to the container 122. Alternatively, the compartment 10 may be integrally formed in the container 122. The attaching device 132 may be, for example, a clamp, a strap, a clip, a fastener and/or the like. It should be understood that the attaching device 132 may be any attaching device which may attach the compartment 10 to the container 122 as known to one of ordinary skill in the art.

The first end 128 and/or the float 130 may move inward or outward with respect to the first end 15 or the sensor array 26 of the compartment 10 based on the level L of the fluid 124. Removing and/or maintaining the fluid 124 to the level L may move the float 130 away from the sensor array 26 to the position P and/or maintain the float 130 at the position P. The sensor array may detect, may measure and/or may determine the intensity of emitted light which may not be absorbed by the interior 22, the tube 128 and/or the float 130.

The microprocessor 28 may be programmed to determine, to calculate and/or to measure the position P of the float 130 based on the intensity of emitted light detected by the sensor array 26. The position P of the float 130 may correspond to and/or may be indicative of the level L of the fluid 124 in the container 122. The microprocessor 28 may be programmed to determine, to calculate and/or to measure a volume of the fluid 124 in the container 122 based on the level L of the fluid 124 in the container 122. The output device 130 may display, may indicate and/or may communicate the level L of the fluid 124, the volume of the fluid 124 and/or the display information of the system 120 to the user 32.

FIG. 11 illustrates a system 150 in an embodiment of the present invention. The system 150 may measure a pressure, such as, for example, barometric pressure, atmospheric pressure and/or the like. The system 150 may have the compartment 10, the second wall 17 and the sensor array 26 in the interior 22 adjacent to the first end 14 of the compartment 10. The movable element 24 may be movable in the interior 22 between the second wall 17 and the first end 14 of the compartment 10.

An amount of a fluid (not shown in the figures) or a vacuum may occupy the interior 22 between the movable element 22 and the second wall 17. Air from outside the compartment 10 may enter the interior 22 via the first end 14 of the compartment 10. The air from outside the compartment 10 may occupy the interior 22 from the movable element 24 to the first end 14 of the compartment 10. A pressure of the air outside the compartment 10 may move, may increase and/or may force the movable element 24 to the position P in the interior 22 of the compartment 10. The sensor array 26 may detect, may determine and/or may measure the intensity of emitted light in the interior 22. The sensor array 26 may not detect the portion of light which may be absorbed by the movable element 24 and/or the interior surface 20.

The microprocessor 28 may be programmed to calculate, to determine and/or to measure the position P of the movable element 24 based on the intensity of emitted light detected by the sensor array 26. The position P of the movable element 24 may correspond to and/or may be indicative of the pressure of the air outside the compartment 10. The microprocessor 28 may be programmed to calculate, to determine and/or to measure the pressure of the air outside the compartment 10 based on the position P of the movable element 24 in the interior 22 of the compartment 10. The output device 30 may display, may indicate and/or may communicate the pressure of the air outside the compartment 10 and/or the display information of the system 150 to the user 32.

The compartment 10 may have the movable element 24 and/or the sensor array 26 in the interior 22 of the compartment 10. The sensor array 26 may have a light source, a first light sensor, a second light sensor, a third light sensor, a temperature sensor and/or a pressure sensor. The movable element 24 and/or the interior surface 20 of the compartment 10 may absorb emitted light from the sensor array 26 in the compartment 10. The sensor array 26 may determine and/or may measure an intensity of the emitted light from the sensor array 26 which may not be absorbed by the movable element 24 and/or the interior surface 20 of the compartment 10. The intensity of emitted light may be based on, may correspond to and/or may be indicative of the position P of the movable element 24 in the interior 22 of the compartment 10. A microprocessor 28 may detect, may measure and/or may calculate the position P of the movable element 24 in the compartment 10 based on the intensity of emitted light detected by the sensor array 26.

The various embodiments of the present invention may be operated by any power supply known by those skilled in the art. In addition, the various embodiments may be operated in and/or may be operated from remote locations through the use of an electric generator, a pressurized air line, or the like.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. An apparatus for measuring a position, the apparatus comprising:

a compartment having a body defining an interior wherein the body has an interior surface, an exterior surface and a length defined between a first end and a second end wherein the first end has an interior wall and an exterior wall wherein the exterior wall is in a position opposite to the first interior wall;

a movable element within the interior of the compartment wherein the movable element is located at a first position in the interior and moves to a second position in the interior;

a first sensor array connected to the interior wall of the first end of the compartment wherein the first sensor array extends inward with respect to the interior of the compartment wherein the first sensor array emits a light into the interior wherein the first sensor array detects a first intensity of light within the interior and a second intensity of light within the interior wherein the first intensity of the light within the interior corresponds to the first position of the movable element within the interior of the compartment and the second intensity of light within the interior corresponds to the second position of the movable element within the interior of the compartment; and a microprocessor in communication with the first sensor array wherein the first sensor array transmits signals indicating the first intensity of light and the second intensity of light to the microprocessor.

2. The apparatus of claim 1 further comprising:
a wall attached to the second end of the compartment.

3. The apparatus of claim 1 further comprising:
an air temperature sensor connected to the sensor array.

4. The apparatus of claim 1 further comprising:
an air pressure sensor connected to the sensor array.

5. The apparatus of claim 1 further comprising:
a groove attached to the exterior surface of the compartment wherein a magnet coupled to the movable element is located within the groove.

6. The apparatus of claim 1 further comprising:
a hole in the compartment extending from the interior surface to the exterior surface wherein the hole connects the interior of the compartment to an interior of a second compartment.

7. The apparatus of claim 1 further comprising:
a tab attached to the interior surface of the compartment wherein the tab extends outward into the interior of the compartment and further wherein the tab is located between the sensor array and the movable element.

8. A system for measuring a position, the system comprising:

a compartment having a body defining an interior wherein the body has an interior surface, an exterior surface and a length defined between a first end and a second end wherein the first end has an interior wall and an exterior wall wherein the exterior wall is in a position opposite to the interior wall;

a movable element connected to the compartment wherein the movable element moves inward or outward with respect to the first end of the compartment wherein the movable element is located at a first position with respect to the first end of the compartment and moves to a second position with respect to the first end of the compartment;

a first sensor array connected to the interior wall of the first end of the compartment wherein the first sensor array extends inward with respect to the interior of the compartment wherein the first sensor array emits a light into the interior wherein the first sensor array detects a first intensity of light within the interior and a second intensity of light within the interior wherein the first intensity of the light within the interior corresponds to the first position of the movable element and the second intensity of the light within the interior corresponds to the second position of the movable element; and a microprocessor in communication with the first sensor array wherein the microprocessor determines the position of the movable element based on the intensity of the light within the interior detected by the first sensor array.

9. The system of claim 8 wherein the movable element is insertable into the interior of the compartment.

10. The system of claim 8 further comprising
a second sensor array located within the interior of the compartment.

11. The system of claim 8 further comprising:
a groove in the body of the compartment wherein a magnet coupled to the movable element is located within the groove.

12. The system of claim 8 further comprising:
a spring attached to the movable element.

13. The apparatus of claim 8 further comprising:
an output device connected to the microprocessor.

* * * * *